United States Patent [19]

Pielkenrood

[11] 4,435,196

[45] Mar. 6, 1984

[54] MULTIPHASE SEPARATOR

[75] Inventor: Jacob Pielkenrood, Krommenie, Netherlands

[73] Assignee: Pielkenrood-Vinitex Beheer B.V., Assendelft, Netherlands

[21] Appl. No.: 351,293

[22] Filed: Feb. 22, 1982

[30] Foreign Application Priority Data

Feb. 27, 1981 [NL] Netherlands .................. 8100955

[51] Int. Cl.³ ............................................. B01D 19/00
[52] U.S. Cl. ....................................... 55/174; 55/185; 55/201
[58] Field of Search ............... 55/174, 176, 185, 192, 55/199, 201

[56] References Cited

U.S. PATENT DOCUMENTS

| | | | |
|---|---|---|---|
| 2,508,528 | 5/1950 | McPherson | 55/185 X |
| 2,656,896 | 10/1953 | Glasgow | 55/174 |
| 2,657,760 | 11/1953 | Glasgow | 55/174 X |
| 2,897,913 | 8/1959 | Hudson | 55/201 X |
| 3,072,224 | 1/1963 | Woody et al. | 55/185 X |
| 3,119,674 | 1/1964 | Glasgow et al. | 55/174 X |
| 3,413,778 | 12/1968 | Lavery et al. | 55/174 X |
| 3,664,093 | 5/1972 | Murdock, Sr. | 55/174 |

FOREIGN PATENT DOCUMENTS 655411 4/1979 U.S.S.R. .................. 55/185

*Primary Examiner*—Robert H. Spitzer
*Attorney, Agent, or Firm*—Beehler, Pavitt, Siegemund, Jagger & Martella

[57] ABSTRACT

A multiphase separator for treating mixtures of more or less immiscible gaseous, liquid and/or solid components, comprising a gas-tight and in particular pressure-proof tank with a horizontal axis in which a cross-flow flare separator is arranged, said tank being, furthermore, provided with connections for supplying a liquid mixture to be treated and for removing separated gaseous, liquid and/or solid components separated therefrom, the plate separator being, in particular, assembled from units adapted to be stacked side by side, behind and/or above one another, said units having such dimensions that they can be introduced into the tank through a manhole.

22 Claims, 5 Drawing Figures

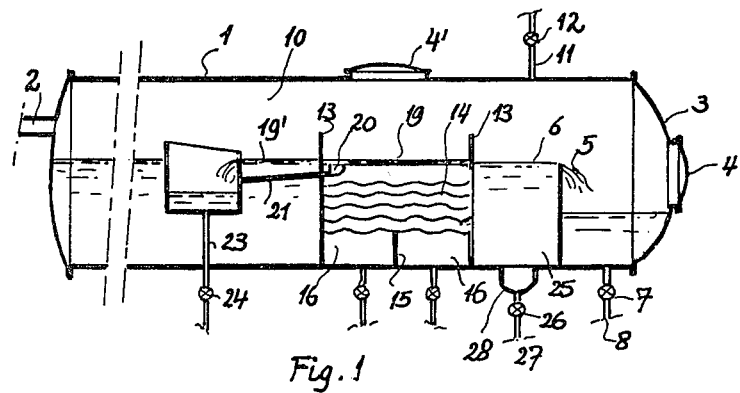
Fig. 1
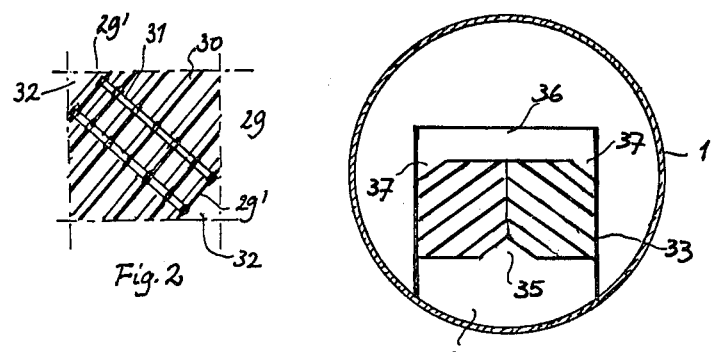
Fig. 2
Fig. 3
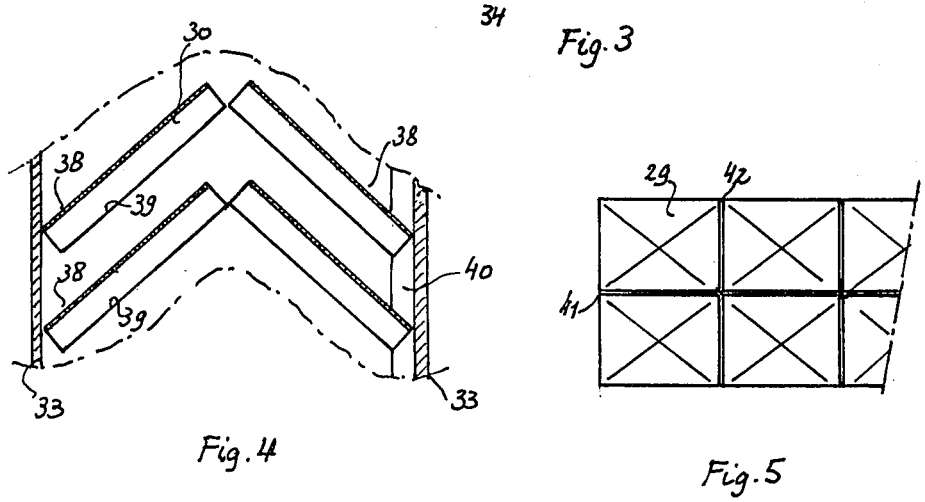
Fig. 4
Fig. 5

MULTIPHASE SEPARATOR

In several industries, i.a. for production and processing of mineral oil, often liquid mixtures of more or less immiscible substances, such as different liquids, gases and sometimes also solids, are produced, and such mixtures are sometimes obtained under pressure.

Demixing of such a mixture can of course occur by leaving it standing for some time, and the not dissolved gases and possible vapours of volatile components can be captured then, whereas the immiscible liquids will separate in different layers and the solids will sedimentate.

At a large supply such a manner of operation is, of course, not very suitable. The invention provides a device for this purpose in which the different components of such mixtures can be separated in a continuous manner.

To that end the device according to the invention is characterised by a gas-tight and, in particular, pressure-proof tank with a substantially horizontal axis, provided with a supply connection for the liquid to be treated situated near one extremity, and with a plurality of discharge connections for the different separated phases, and by a plate separator with parallel corrugated plates having an inclination transversely to the longitudinal axis of the tank, said separator being adapted for cross-flow separation, and being provided with an inlet window which is constructed in such a manner that the liquid is forced to flow through the passages between the plates, and by an overflow weir determining the normal liquid level in the tank, said discharge connections being situated so that the different components separated in said tank can be removed in a mutually separated manner.

Since a cross-flow separator allows a horizontal passage of the liquid flow, the lighter and heavier components then being separated from a main flow in the transverse direction, multiphase mixtures can be treated as such in a continuous flow. The gases collect in the upper part above the liquid level determined by the overflow weir, and, furthermore, a lighter liquid can float on the liquid mass and can be discharged by means of suitable overflow gutters, whereas the heavy components, in particular a heavy liquid or a solid component, are collected below the separator and can be separately discharged.

In the case of a pressurized system the discharge means should, of course, be provided with suitable valves which are adapted to be opened at intervals for discharging the abovementioned components. If required separate collecting vessels can be arranged inside the tank for facilitating the discharge.

Such tanks will often have large dimensions, and, in particular in the case of pressure tanks, generally have a cylindrical shape, and at least at one extremity a closing lid will be provided. Such vessels are generally constructed by specialised factories, and, in the case of pressure tanks, have to be tested for strength and leakproofness, and preferably the separator is arranged therein later. This requires an expensive end cover with heavy flanges, and opening and closing again such a cover for arranging a plate separator will be objectionable.

According to the invention, therefore, preferably a cross-flow separator is used which is composed of a plurality of units which are adapted to be introduced through a manhole provided in a wall of the tank, and in particular in an end wall or cover, which units can be arranged inside the tank side by side, behind and/or above one another.

In this manner it becomes possible to manufacture the tank first in a specialised factory, and to test it on strength and leakproofness, and afterwards it is transported in the closed condition towards its destination where only the manhole is to be opened for allowing the inside of the tank to be finished and for arranging therein the separator and associated elements.

In particular supports are used therefor on which said units can be kept in place, which supports, moreover, can serve as parts of partition baffles defining spaces for collecting components separated between the plates. Additional baffles can be arranged above these units for completing the partition baffles and for defining a collecting space also at the upper side.

In particular such plate units can be juxtaposed in pairs with an opposite plate inclination, the adjoining corrugated longitudinal edges of corresponding plates of two adjacent units then defining, because of their corrugations, apertures through which light components, including gases, separated between the plates and sliding away along the plates are allowed to escape towards the collecting space in question.

The whole assembly of plates is, in particular, positioned between two longitudinal walls for laterally defining the separation space, and the spaces outside these walls, if separated from the main space of the tank, can, if desired, be used as collecting spaces for separated components.

Between the terminal baffles of the plate assembly additional supporting baffles can be provided which, as the case may be, can define separate collecting chambers for separated components which can be provided with separate discharge connections, and also vertical baffles can be present for avoiding that the liquid flow will flow outside the separation passages and around the plate assembly.

Furthermore grids or latice-works can be provided between pairs of plate units arranged above and/or behind one another is so as to avoid that plates of an adjoining unit will penetrate into the spaces between the plates of the other unit, which grids or latice-works will, furthermore, equally distribute the weight of a superposed unit, and will prevent short-circuit liquid flows between such units.

The invention will be elucidated below by reference to a drawing, showing in:

FIG. 1 a diagrammatic cross-section of a device according to the invention;

FIG. 2 a diagrammatic cross-section of a plate unit of the cross-flow separator of this device;

FIG. 3 a lateral view of this plate separator;

FIG. 4 a diagrammatic partial cross-section at a larger scale of the part IV of FIG. 3; and FIG. 5 a simplified diagrammatic representation of a multiple-unit separator for such a device.

A tank 1 shown in FIG. 1 is provided, at its left-hand extremity, with a supply connection 2 for the liquid to be treated. This liquid consists, for example, of water having suspended therein oil, heavy liquid or solid components, and non-dissolvable gas or a volatile liquid which can be separated by evaporation.

The other extremity of the tank is closed by an end wall 3 in which a manhole 4 with a cover is provided. If necessary additional manholes 4' can be provided at the upper side of the tank. An overflow weir 5 extending over the full width determines the normal liquid level 6 in the part between the supply 2 and the overflow 5. In the other part between the overflow 5 and the end wall 3 a discharge 8 provided with a valve 7 for the liquid 9 flowing over the overflow weir 5 is provided, by means of which this liquid can be removed. Above the liquid a gas space 10 is present in which gas escaping from the liquid will be collected, which gas can be removed by means of a duct 11 with a valve 12.

Between two baffles 13 extending above the liquid level 6 an assembly 14 of corrugated plates is arranged, which plates are positioned mutually parallel and mainly parallel to the longitudinal axis of the tank 1, the corrugations being directed transversely to this longitudinal axis. Furthermore this assembly 14 is supported between the baffles 13 by means of an intermediary baffle 15, and, of course, more than one baffle 15 can be present, and between these baffles 13 and 15 chambers 16 are present each communicating with a duct 18 provided with a valve 17. For the rest it is also possible to use intermediary baffles 15 which only act as supports, so that, then, a single discharge is sufficient.

The device shown is adapted for four-phase separation, in which a lighter liquid is separated in the separator 14 from the carrier liquid, and will, then, flotate between the baffles 13 to form a floating layer 19 on the liquid surface 6. An overflow gutter 20 serves to remove this floating layer, which gutter communicates by means of a duct 21 with a collecting vessel 22 separated from the liquid flow, which vessel is connected to a duct 23 with a valve 24 leading outwards. The vessel 22 is placed in such a manner that components flotating already before the separator 14 can flow directly over the edge of this vessel. It is also possible to extend the intermediary baffles 15 upwards above the separator so as to divide the flotation space thereabove into partial spaces if this is favourable for the separation, and to provide these partial spaces with separate discharge means for the floating layer.

In the chamber 25 situated between the overflow weir 5 and the rear baffle 13, in which the liquid which has passed through the assembly 14 is collected before flowing off over the overflow weir 5, after-separation by precipitation, e.g. of a heavier liquid, can take place, and discharge thereof can take place afterwards through a duct 27 provided with a valve 26, which duct opens, in particular, in a collecting dome 28 formed in the bottom of the tank 1.

If the liquid which has passed through the plate assembly 14 has a smaller volume than the lighter flotating liquid, the former can, for instance, be discharged through the duct 27, and then the lighter liquid can flow over the weir 5, in which case the rear baffle 13 should be made lower.

When the plate assembly 14 is to be arranged in such a tank after the latter has been manufactured and has been tested in the closed condition, it can be objectionable to remove the end wall 3 again. Therefore, according to the invention, an assembly 14 is preferably used which is assembled from a plurality of partial units which can each be introduced through the manhole 4.

FIG. 2 shows a cross-section of such a unit 29, consisting of a plurality of corrugated plates 30 united with one another by means of tensioning bolts and distance pieces 31 to form a coherent assembly. The extreme plates 29' are somewhat shorter than the other ones, but not so short that the surface area thereof should become too small, so that two corner portions 32 of the rectangle defining the plate unit are not filled.

Such units can be juxtaposed in the manner shown in FIG. 3, lateral plates 33 bordering the assembly. The units 29 bear on at least two bottom supports 34 with a central projection 35 having the shape of two joined corner recesses 32 of the adjacent units 29. Above these units an upper plate 36 is arranged having two corner projections 37 fitting into the corner recesses 32 of these plate units. Together the plates 34 and 36 form a baffle 13. Also the other baffle 13 can be assembled from such supporting plates, which also holds for the intermediate baffles 15, and, if necessary, such an intermediate baffle can be provided at one side only.

Depending on the dimensions of the tank and the desired separation effect, several units of this kind can be arranged behind one another and, if necessary, also on top of one another.

FIG. 4 shows the manner in which the plates of such units join one another in the arrangement of FIG. 3. At the lower side the tops 38 of the various superposed plates contact the lateral wall 33. The valleys 39 remain then at some distance of said wall so that, there, sediment sliding down through the valleys can slide downwards along the lateral wall 33. It is also possible, as represented at the right-hand side of FIG. 4, to use auxiliary baffles 40 engaging the tops so that between these auxiliary baffles discharge channels for heavy components are obtained.

At the higher side the valleys of corresponding plates of both units engage one another, so that, now, passages between the tops 38 are obtained through which lighter components can escape upwards. If necessary vertical baffles corresponding to baffles 40 can be arranged also between two juxtaposed units.

For the rest such units can also be juxtaposed with joining lower sides, and then the lighter components will move upwards near the lateral walls 33. This depends, of course, of the character of the multiphase mixture and of the components to be separated therefrom.

Furthermore it will be clear that the number and place of the various discharge connections depend on the character of the multiphase mixture. Sometimes it can be advisable to arrange the connections in a bulge of the tank in which the component in question can collect, e.g. as shown at 26.

If the mixture to be treated is supplied under pressure, a pressure-proof tank should, of course, be used, and the valve should then be opened at intervals, and, of course, care should be taken that the pressure is sufficiently throttled.

Furthermore it is possible to use the space between the lateral walls 33 and the tank wall as discharge or storage spaces for separated components.

An important advantage of such plate assemblies composed of smaller units which can be introduced through a manhole is that arranging the plate assemblies can be done after completing all other operations, including testing the tank. The units can be easily removed for cleaning and repair, and it is also possible to add further units afterwards if a larger capacity is required. This can be a particular advantage in the case of off-shore installations where it is very objectionable or even impossible to remove the end wall 3.

When several units are to be stacked or juxtaposed in the axial direction, it is often very difficult to obtain a sufficient continuity of the corresponding passages between the corrugated plates of adjacent units.

In the case of units juxtaposed in the axial direction, the corrugations of adjacent units will seldom form a continuous wave, and, if the plates of one unit penetrate into the passages between plates of the other unit, the passages will be narrowed, and will be easily obstructed by sediment accumulated there.

In the case of superposed units the plates of the upper unit should be supported by the lower one, and, since the plates are not necessarily exactly aligned, additional means should be used for supporting them. If a small distance is left between such units, longitudinal liquid flows will disturb the transfer of separated components sliding along the plates of one unit towards the other unit.

These difficulties can, in both cases, be avoided by interposing between two adjoining plate units a grid or latice-work made of flat strips which extend at an angle in respect of the corrugated plates of the adjacent units, which strips are brought into contact with said plates. Such grids can consist of at least one set of parallel strips, and particularly of two sets intersecting one another at an angle, in particular of 90°. Such grids or latice-works will avoid the corrugated plates from penetrating into the passages of the adjacent unit, and, moreover, ensure a smooth flow of liquid or separated components from one unit towards the other one. In the second case such grids will evenly distribute the weight of the upper unit over the lower one, and, moreover, will prevent axially directed liquid flows from flowing through the interspace between the units.

FIG. 5 shows diagrammatically grids 41 arranged between two superposed units 29, and grids 42 arranged between two units juxtaposed in the axial direction.

I claim:

1. A multiphase separation device, comprising a gas-tight tank with a substantially horizontal axis, which tank is provided with a supply connection for the liquid to be treated opening near one extremity of said tank into an inlet space thereof, a plurality of discharge connections for the different gaseous, liquid or solid phases, a plate separator arranged within said tank with inclined parallel corrugated plates adapted for cross-flow separation, an overflow weir arranged at the other side of said separator for determining the normal liquid level in said tank, above which a gas phase collecting space is present, extending over substantially the whole length of the tank, the discharge connections being situated so that the different components separated in the tank and in the cross-flow separator can be discharged separately from one another, in which;

said overflow weir is designed to determine the normal level of a heavier liquid phase of the liquid to be treated, discharge means for said heavier liquid phase being provided at the downstream side of said overflow weir;

said plate separator being confined between two transverse baffles extending upwards into said gas space, said baffles being provided with an inlet and an outlet window respectively;

the plates of said separator being substantially submerged below said normal level, said windows defining a substantially horizontal liquid flow through the passages between said plates, overflow means for collecting a lighter liquid phase separated in said passages and floating as a floating layer on the liquid between said baffles being provided above said separator, said baffles extending sufficiently above said normal level for restraining said floating layer between said baffles;

additional overflow means being provided in said inlet space for removing a floating layer of said lighter liquid phase separated from said liquid in said inlet space;

discharge means being provided for discharging a heaviest phase separated from said liquid in said passages and collected in the space below said separator; and additional discharge means being provided for discharging said heaviest phase separated in the space between the downstream baffle and said overflow weir.

2. The separator of claim 1, adapted for treating a pressurized liquid mixture, characterised in that the discharge connections are provided with valves.

3. The separator of claim 2, characterised in that inside the tank (1) separate collecting vessels (16, 22, 28) for collecting separately separated components are arranged which are connected to an associated discharge duct (27) provided with a valve.

4. The separator of claim 3, provided with an overflow gutter (20) for collecting components floating on the liquid surface, characterised in that a collecting vessel (22) connected to said gutter (20) is arranged before the plate separator (14) and is provided with an overflow edge so as to be adapted to collect components which flotate already before the plate separator (14).

5. The separator of claim 1 or claim 2 or claim 3 or claim 4 in which the tank is provided with at least one manhole, characterised in that the plate separator is composed of units which are stacked side by side, behind and/or above one another, the dimensions of such a unit being such that it can be introduced through a manhole.

6. The separator of claim 5, characterised by supports (13, 15) arranged in the tank (1), which are adapted to the shape of a plate unit (29), and which, together with adjoining parts, form a partition baffle for defining a separator space.

7. The separator of claim 5 wherein the plate units are juxtaposed in pairs with opposite slope, so that between adjoining pairs of plates of different plate units passages for components separated between the plates are defined.

8. The separator of claim 5 wherein the plate assembly is arranged between two longitudinal walls laterally defining the separation space, the spaces outside these walls being separated from the main space of the tank.

9. The separator of claim 5 further comprising grids or lattice-works provided between pairs of plate units arranged above and/or behind one another.

10. The separator of claim 1 further comprising additional supporting baffles for the plate assembly between which separate collecting chambers for separated components are defined, each separate chamber including separate discharge means.

11. A multiphase separation device, comprising a gas-tight tank with a substantially horizontal axis, which tank is provided with a supply connection for the liquid to be treated opening near one extremity of said tank into an inlet space thereof, a plurality of discharge connections for the different gaseous, liquid or solid phases, a plate separator arranged within said tank with inclined parallel corrugated plates adapted for cross-flow separation, an overflow weir arranged at the other side of said separator for determining the normal liquid level in said tank, above which a gas phase collecting space is present, extending over substantially the whole length of the tank, the discharge connections being situated so that the different components separated in the tank and in the cross-flow separator can be discharged separately from one another, in which:

said gas tight tank is provided with one or more manholes of substantially restricted aperture relative to the internal dimensions of said tank and said plate separator comprises a modular plate assembly, said modular assembly including at least two plate units constructed to be juxtaposed side by side between a pair of lateral plates, each said unit being sufficiently small for introduction through one said man-hole;

each unit comprising a plurality of plates corrugated transversely to the direction of flow in said tank and fastened together in mutually spaced parallel relationship;

each unit defining a generally rectangular assembly when viewed in the direction of flow;

said plates lying diagonally within said rectangle, such that two units may be juxtaposed along one side with the plates of each unit having opposite slopes.

12. The separator of claim 11 further comprising supports arranged in the tank, which supports are adapted to the shape of a plate unit, and which, together with adjoining parts, form a partition baffle for defining a separator space.

13. The separator of claim 11 wherein the plate units are juxtaposed in pairs with opposite slope, so that between adjoining pairs of plates of different plate units passages for components separated between the plates are defined.

14. The separator of claim 11 wherein the modular plate assembly is arranged between two longitudinal walls laterally defining the separation space, the spaces outside these walls being separated from the main space of the tank.

15. The separator of claim 11 further comprising grids or lattice-works provided between pairs of plate units arranged above and/or behind one another.

16. The separator of claim 11 wherein said corrugated plates have tops and valleys and said plates have edges adjacent to said side plates at the lower side of said plates and juxtaposed edges at the high side of at least some plates in each pair of juxtaposed plate units, said valleys defining openings with said side plates through which heavier phases may descend, and said tops defining openings at said juxtaposed edges through which lighter phases may rise in said plate separator.

17. The separator of claim 16 wherein a plurality of laterally juxtaposed pairs of plate units are juxtaposed in the direction of flow.

18. The separator of claim 12 or claim 17 wherein the rectangles defined by said plate units are truncated at diagonally opposite corners along a diagonal perpendicular to said plates.

19. The separator of claim 18 further comprising means interposed between axially juxtaposed plate units for promoting the smooth, unobstructed flow of fluid from the plates of one unit to the plates of the next unit.

20. The separator of claim 18 wherein at least two said plate units are stacked vertically and further comprising support means interposed between each pair of stacked units for preventing meshing of the plates of the stacked units and for substantially preventing axial flow of fluid in the space between said vertically stacked units.

21. The separator of claim 19 or 20 wherein said means interposed comprise parallel strips disposed at an angle to the edges of said plates.

22. The separator of claim 21 wherein said strips define a grid between said units.

* * * * *